United States Patent
Cross et al.

(10) Patent No.: US 7,658,031 B2
(45) Date of Patent: Feb. 9, 2010

(54) HANDHELD RANGEFINDER OPERABLE TO DETERMINE HOLD OVER BALLISTIC INFORMATION

(75) Inventors: John Cross, Overland Park, KS (US); Jordan Vermillion, Overland Park, KS (US)

(73) Assignee: Bushnell, Inc., Overland Park, KS (US)

( * ) Notice: Subject to any disclaimer, the term of this patent is extended or adjusted under 35 U.S.C. 154(b) by 160 days.

(21) Appl. No.: 11/314,593

(22) Filed: Dec. 21, 2005

(65) Prior Publication Data

US 2007/0137091 A1  Jun. 21, 2007

(51) Int. Cl.
F41G 3/06 (2006.01)
G01C 3/04 (2006.01)

(52) U.S. Cl. .................. 42/142; 356/4.01

(58) Field of Classification Search .......... 42/111, 42/114, 130, 142; 359/399; 356/4.01, 11, 356/141.1; 89/36.01, 36.02, 36.03, 36.04, 89/36.07, 36.08, 36.09, 36.12, 36.17; 428/188, 428/304.4, 313.3, 314.2, 321.5, 457, 911

See application file for complete search history.

(56) References Cited

U.S. PATENT DOCUMENTS

| | | |
|---|---|---|
| 3,464,770 A | 9/1969 | Schmidt |
| 3,563,151 A | 2/1971 | Koeber |
| 3,584,559 A | 6/1971 | Levin |
| 3,639,997 A | 2/1972 | Koeber |
| 3,644,043 A | 2/1972 | Jones et al. |
| 3,653,769 A | 4/1972 | Albright |
| 3,679,307 A | 7/1972 | Zoot et al. |
| 3,688,408 A | 9/1972 | Smith et al. |
| 3,690,767 A | 9/1972 | Missio et al. |
| 3,737,232 A | 6/1973 | Milburn, Jr. |
| 3,754,828 A | 8/1973 | Darvasi |
| 3,781,111 A | 12/1973 | Fletcher et al. |
| 3,797,909 A | 3/1974 | Hadzimahalis |
| 3,839,725 A | 10/1974 | Koppensteiner |
| 3,845,276 A | 10/1974 | Kendy et al. |
| 3,847,474 A | 11/1974 | Uterhart |
| 3,895,871 A | 7/1975 | Strasser |
| 3,897,150 A | 7/1975 | Bridges et al. |
| 3,899,251 A | 8/1975 | Frenk et al. |
| 3,982,246 A | 9/1976 | Lubar |
| 3,992,615 A | 11/1976 | Bennett et al. |
| 4,025,193 A | 5/1977 | Pond et al. |

(Continued)

OTHER PUBLICATIONS

Handout from speech given by Major John L. Plaster to The Joint Service Small Arms Program (JSSAP); 1993 Sniper Conference; Apr. 15, 1993.

(Continued)

Primary Examiner—Bret Hayes
(74) Attorney, Agent, or Firm—Hovey Williams LLP

(57) ABSTRACT

A handheld rangefinder device operable to determine ballistic hold over information is disclosed. The rangefinder device generally includes a range sensor operable to determine a first range to a target, a tilt sensor operable to determine an angle to the target relative to the device, and a computing element, coupled with the range sensor and the tilt sensor, operable to determine a hold over value based on the first range and the determined angle. Such a configuration facilitates accurate firearm and bow use by providing ranges and hold over values without requiring time-consuming and manual user calculations.

22 Claims, 5 Drawing Sheets

U.S. PATENT DOCUMENTS

| | | | |
|---|---|---|---|
| 4,136,394 A | | 1/1979 | Jones et al. |
| 4,173,402 A | | 11/1979 | Horike et al. |
| 4,195,425 A | | 4/1980 | Leitz et al. |
| 4,266,463 A | | 5/1981 | Saltin |
| 4,268,167 A | | 5/1981 | Alderman |
| 4,305,657 A | | 12/1981 | Masunaga et al. |
| 4,321,683 A | | 3/1982 | Goring et al. |
| 4,329,033 A | | 5/1982 | Masunaga et al. |
| 4,355,904 A | | 10/1982 | Balasubramanian |
| 4,457,621 A | | 7/1984 | Harris et al. |
| 4,531,052 A | | 7/1985 | Moore |
| 4,561,204 A | * | 12/1985 | Binion .................. 42/122 |
| 4,593,967 A | | 6/1986 | Haugen |
| 4,617,741 A | | 10/1986 | Bordeaux et al. |
| 4,665,795 A | | 5/1987 | Carbonneau et al. |
| 4,681,433 A | | 7/1987 | Aeschlimann |
| 4,760,770 A | | 8/1988 | Bagnall-Wild et al. |
| 4,777,352 A | | 10/1988 | Moore |
| 4,787,739 A | | 11/1988 | Gregory |
| 4,834,531 A | | 5/1989 | Ward |
| 4,949,089 A | | 8/1990 | Ruszkowski, Jr. |
| 4,965,439 A | | 10/1990 | Moore |
| 4,988,189 A | | 1/1991 | Kroupa et al. |
| 5,022,751 A | | 6/1991 | Howard |
| 5,026,158 A | * | 6/1991 | Golubic .................. 356/252 |
| 5,082,362 A | | 1/1992 | Schneiter |
| 5,216,815 A | | 6/1993 | Bessacini |
| 5,233,357 A | | 8/1993 | Ingensand et al. |
| 5,241,360 A | | 8/1993 | Key et al. |
| 5,262,838 A | | 11/1993 | Tocher |
| 5,280,332 A | | 1/1994 | Tocher et al. |
| 5,291,262 A | | 3/1994 | Dunne |
| 5,294,110 A | | 3/1994 | Jenkins et al. |
| 5,311,271 A | | 5/1994 | Hurt et al. |
| 5,313,409 A | | 5/1994 | Wiklund et al. |
| 5,359,404 A | | 10/1994 | Dunne |
| 5,374,985 A | | 12/1994 | Beadles et al. |
| 5,374,986 A | | 12/1994 | Solinsky |
| 5,375,072 A | | 12/1994 | Cohen |
| 5,479,712 A | | 1/1996 | Hargrove et al. |
| 5,483,336 A | | 1/1996 | Tocher |
| 5,519,642 A | | 5/1996 | Kishimoto |
| 5,539,513 A | | 7/1996 | Dunne |
| 5,568,152 A | | 10/1996 | Janky et al. |
| 5,586,063 A | | 12/1996 | Hardin et al. |
| 5,589,928 A | | 12/1996 | Babbitt et al. |
| 5,634,278 A | | 6/1997 | London |
| 5,638,163 A | | 6/1997 | Nourricier, Jr. |
| 5,650,949 A | | 7/1997 | Kishimoto |
| 5,669,174 A | * | 9/1997 | Teetzel .................. 42/115 |
| 5,677,760 A | | 10/1997 | Mikami et al. |
| 5,686,690 A | | 11/1997 | Lougheed et al. |
| 5,691,808 A | | 11/1997 | Nourrcier, Jr. et al. |
| 5,751,406 A | | 5/1998 | Nakazawa et al. |
| 5,806,020 A | | 9/1998 | Zykan |
| 5,812,893 A | | 9/1998 | Hikita et al. |
| 5,824,942 A | | 10/1998 | Mladjan et al. |
| 5,914,775 A | | 6/1999 | Hargrove et al. |
| 5,933,224 A | | 8/1999 | Hines et al. |
| 5,940,171 A | | 8/1999 | Tocher |
| 6,023,322 A | | 2/2000 | Bamberger |
| 6,034,764 A | | 3/2000 | Carter |
| 6,131,294 A | * | 10/2000 | Jibiki .................. 42/119 |
| 6,252,706 B1 | * | 6/2001 | Kaladgew .................. 359/399 |
| 6,407,817 B1 | | 6/2002 | Norita et al. |
| 6,634,112 B2 | | 10/2003 | Carr et al. |
| 6,873,406 B1 | | 3/2005 | Hines et al. |
| 6,886,287 B1 | | 5/2005 | Bell et al. |
| 7,118,498 B2 | | 10/2006 | Meadows et al. |
| 2002/0107768 A1 | | 8/2002 | Davis et al. |
| 2004/0020099 A1 | * | 2/2004 | Osborn, II .................. 42/122 |
| 2005/0021282 A1 | * | 1/2005 | Sammut et al. .............. 702/150 |
| 2005/0046706 A1 | | 3/2005 | Sesek et al. |
| 2005/0198885 A1 | * | 9/2005 | Staley .................. 42/142 |
| 2005/0221905 A1 | | 10/2005 | Dunne et al. |
| 2007/0137088 A1 | * | 6/2007 | Peters et al. .................. 42/111 |

OTHER PUBLICATIONS

Presentation entitled "The Ranging Laser Scope (RLS)" by Major John L. Plaster; 2006.
U.S. Appl. No. 11/323,722, filed Dec. 30, 2005, Cross et al.
U.S. Appl. No. 10/867,429, filed Jun. 14, 2004, Perkins et al.
McNeill, M.D. Williams, L. HuaMeng Chu "Design of a time-of-flight range-finder" Frontiers in Education Conference, 1999. FIE '99. 29th Annual, San Juan, Nov. 10-13, 1999, vol. 3, 13D6/17-13D6/22 vol. 3, ISBN: 0-7803-5643-8, DOI 10.1109/FIE.1999.840476, Nov. 13, 1999.
Pito, R., "Characterization, Calibration, and Use of the Perception Laser Range Finder in a Controlled Environment," (1995). http://scholar.google.com/scholar?num=50&hl=en&lr=&q=3D+laser+rangefinder+-patents&as_ylo=&as_yhi=1997&btnG=Search, 1995.
Leica Geovid 7x42BD Laser Rangefinder Binoculars, eBay item 110227983724, Mar. 5, 2008.
NAIT XLR Range Finder, http://web.archive.org/web//19980119122437/nait.com/xlr.html, Jan. 19, 1998.
"Quantum Range Finding" by Bill Winke, Bowhunting, pp. 49-53 & 97, Aug. 1995.
"A look at what's new in laser Rangefinders" by L.D. Standish, Precision Shoot-ing, pp. 44-49, Nov. 1997.
Criterion Series Hand Held Survey Lasers (advertisement).
Hermet, P., "Design of a rangefinder for military purposes," Applied Optics. 11, 273-(1972), 1972.
Woodward, J, et al., "Rangefinder, laser AN/GVS-5,", Jun. 1977.
Leica VECTOR Rangefinding Binoculars, http://web.petabox.bibalex.org/web/19970607010412/www.leica.com/optronics/product/vector.htm, Jun. 7, 1997.
VX Optranics Corp., Hawk Expeditor & Hawk XTR (2-page advertisement).

* cited by examiner

US 7,658,031 B2

HANDHELD RANGEFINDER OPERABLE TO DETERMINE HOLD OVER BALLISTIC INFORMATION

BACKGROUND OF THE INVENTION

1. Field of the Invention

The present invention relates to handheld rangefinders that assist a user in compensating for deviations in projectile trajectory. More particularly, the present invention relates to a handheld rangefinder that utilizes a range sensor and a tilt sensor to determine hold over ballistic information corresponding to projectile trajectories.

2. Description of the Related Art

Hunters and other firearm and bow users commonly utilize handheld rangefinders to determine ranges to targets. Generally, handheld rangefinders utilize lasers to acquire ranges for display to a hunter. Utilizing the displayed ranges, the hunter makes sighting corrections to facilitate accurate shooting. Unfortunately, due to variations in elevation and slope, the ranges determined by handheld rangefinders often are not accurate representations of the horizontal distances projectiles must travel.

For example, as shown in FIG. 1, a hunter positioned above or below a target may be provided a range, 9 yards for instance, that is different than the actual horizontal distance to the target, 5 yards for instance, thereby resulting in inaccurate shooting. Further, handheld rangefinders fail to determine hold over ballistic information corresponding to the amount by which hunters must vary their aim, thereby forcing hunters to manually perform hold over calculations.

Devices operable to compensate for slope and elevation utilizing lasers and inclinometers have been developed to alleviate some of these problems. For example, U.S. patent application Ser. Nos. 10/867,429 and 10/964,206, which are incorporated herein by reference, disclose telescope sights and other optical devices having a laser range sensor and an inclinometer. Unfortunately, these devices have a limited field of vision, must be attached to a firearm or bow, or are unable to provide hold over ballistic information. Thus, hunters are unable to avail themselves of the beneficial aspects of handheld rangefinders, such as increased field of vision, maneuverability, and portability, while correcting for range, slope, elevation, and rangefinder orientation utilizing hold over ballistic information.

SUMMARY OF THE INVENTION

The present invention solves the above-described problems and provides a distinct advance in the art of handheld rangefinders. More particularly, the invention provides a handheld rangefinder that utilizes a range sensor and a tilt sensor to determine hold over ballistic information corresponding to projectile trajectories. Such a configuration facilitates accurate firearm and bow use by providing ranges and hold values without requiring time-consuming and manual user calculations.

In one embodiment, the present invention provides a rangefinder device for determining hold over ballistic information. The device generally includes a range sensor operable to determine a first range to a target, a tilt sensor operable to determine an angle to the target relative to the device, and a computing element, coupled with the range sensor and the tilt sensor, operable to determine a hold over value based on the first range and the determined angle.

In another embodiment, the rangefinder device includes a laser range sensor operable to determine a first range to a target, a tilt sensor operable to determine an angle to the target relative to the device, a memory comprising a database of ranges and corresponding projectile drop values, a computing element operable to determine a hold over value based on the first range and the determined angle by acquiring one of the projectile drop values from the database and modifying the acquired projectile drop value utilizing the determined angle, and a display operable to indicate the first range and the hold over value.

In another embodiment, the rangefinder device includes a laser range sensor operable to determine a first range to a target, a tilt sensor including an inclinometer operable to determine an angle to the target relative to the device, an input operable to receive configuration information from a user, a memory comprising a database of ranges and corresponding projectile drop values, a computing element operable to determine a hold over value based on the first range, the configuration information, and the determined angle by acquiring one of the projectile drop values from the database and modifying the acquired projectile drop value utilizing the determined angle, a display operable to indicate the first range and the hold over value, and a portable handheld housing.

In another embodiment, the present invention provides a method for determining hold-over ballistic information. The method generally comprises determining a first range to a target, determining an angle to the target, and determining a hold over value based on the first range and the determined angle by acquiring a projectile drop value and modifying the projectile drop value utilizing the determined angle.

Other aspects and advantages of the present invention will be apparent from the following detailed description of the preferred embodiments and the accompanying drawing figures.

BRIEF DESCRIPTION OF THE DRAWINGS

A preferred embodiment of the present invention is described in detail below with reference to the attached drawing figures, wherein.

Figure 1:
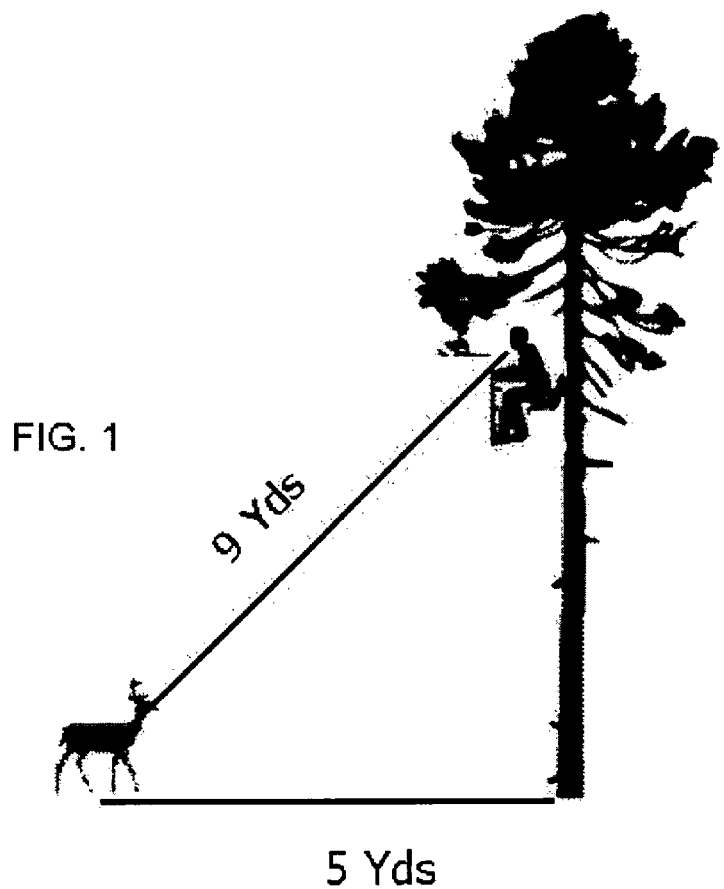
FIG. 1 is a schematic view showing various distances between a hunter and a target.

The drawing figures do not limit the present invention to the specific embodiments disclosed and described herein. The drawings are not necessarily to scale, emphasis instead being placed upon clearly illustrating the principles of the invention.

DETAILED DESCRIPTION OF PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning now to the drawing figures, and particularly FIGS. 1-10, a rangefinder device 10 is shown constructed in accordance with various preferred embodiments of the present invention. The device 10 generally includes a range sensor 12 for determining a first range to a target T, a tilt sensor 14 for determining an angle to the target T, a computing element 16 coupled with the range sensor 12 and the tilt sensor 14 for determining ballistic information relating to the target T based on the first range and the determined angle, a memory 18 for storing data such as ballistic information and a computer program to control the functionality of the device 10, and a portable handheld housing 20 for housing the range sensor 12, the tilt sensor 14, the computing element 16, the memory 18, and other components described below.

A computer program preferably controls input and operation of the device 10. The computer program includes at least one code segment stored in or on a computer-readable medium residing on or accessible by the device 10 for instructing the range sensor 12, tilt sensor 14, computing element 16, and any other related components to operate in the manner described herein. The computer program is preferably stored within the memory 18 and comprises an ordered listing of executable instructions for implementing logical functions in the device 10. However, the computer program may comprise programs and methods for implementing functions in the device 10 which are not an ordered listing, such as hard-wired electronic components, programmable logic such as field-programmable gate arrays (FPGAs), application specific integrated circuits, conventional methods for controlling the operation of electrical or other computing devices, etc.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer-readable medium may even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The device 10 and computer program described herein are merely examples of a device and a program that may be used to implement the present invention and may be replaced with other devices and programs without departing from the scope of the present invention.

Figure 2:
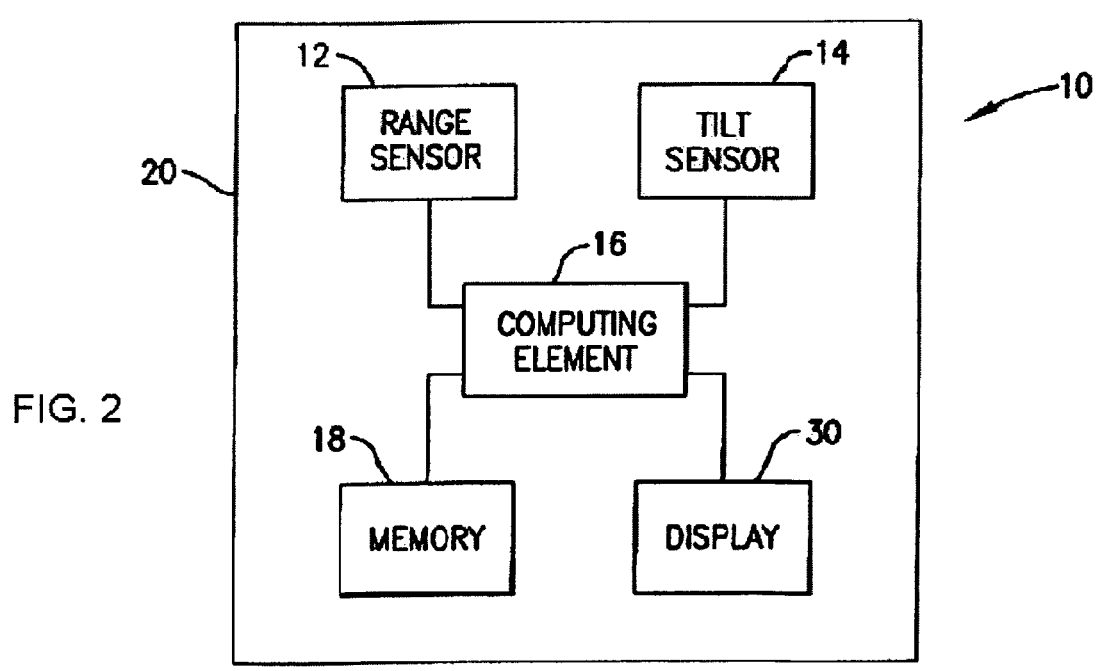
FIG. 2 is a block diagram of a rangefinder device configured in accordance with various preferred embodiments of the present invention.
Figure 3:
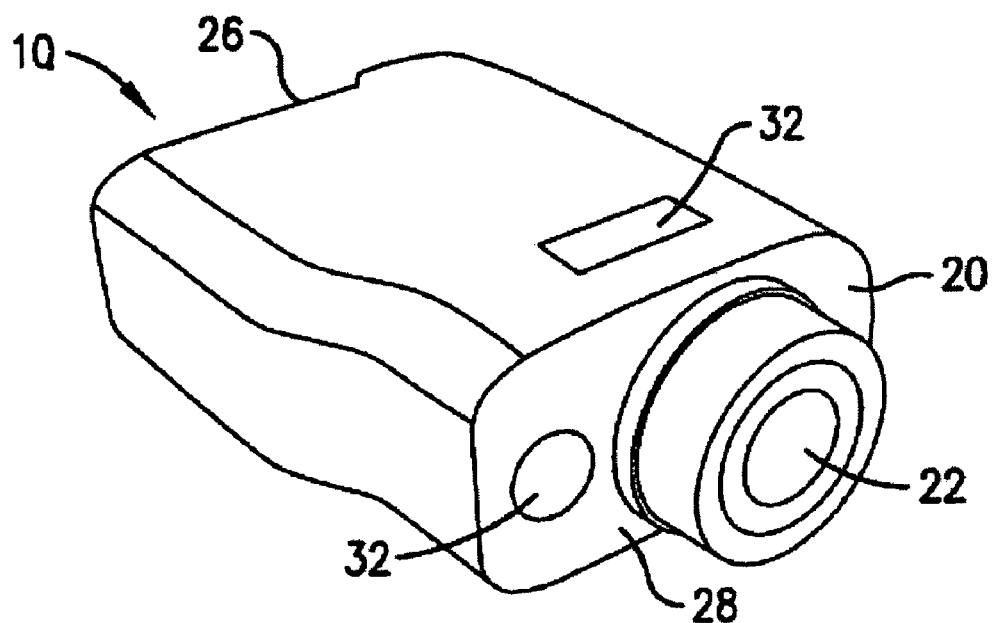
FIG. 3 is a rear perspective view of the rangefinder device of FIG. 2.
Figure 4:
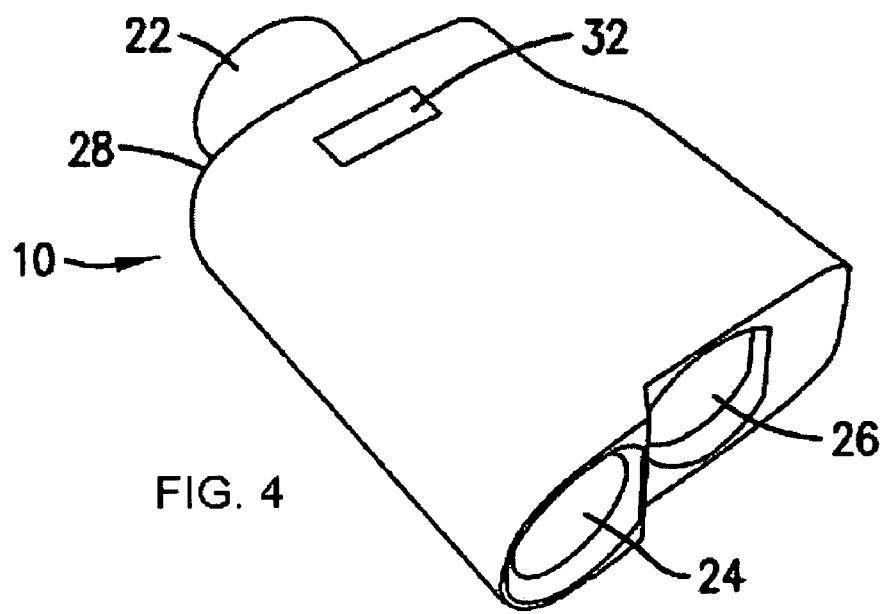
FIG. 4 is a front perspective view of the rangefinder device of FIGS. 2-3.
Figure 5:
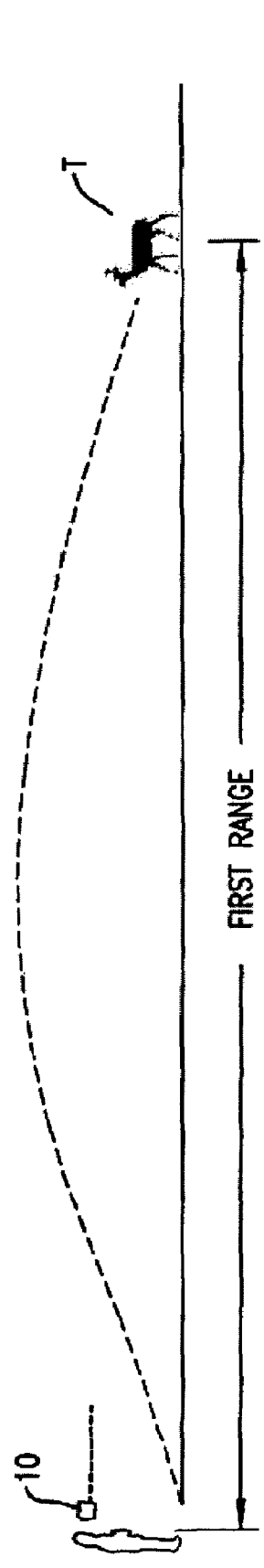
FIG. 5 is a diagram illustrating a first range to a target and an associated projectile trajectory.

Referring to FIGS. 2-4, the range sensor 12 is operable to determine the first range to the target T from the device 10. The range sensor 12 may be any conventional sensor or device for determining range. The first range preferably represents a length of an imaginary line drawn between the device 10 and the target T, as shown in FIG. 5, such as the number of feet, meters, yards, miles, etc., directly between the device 10 and the target T. Thus, the first range may correspond to a line of sight (LOS) between the device 10 and the target T.

Preferably, the range sensor 12 is a laser range sensor which determines the first range to the target by directing a laser beam at the target T, detecting a reflection of the laser beam, measuring the time required for the laser beam to reach the target and return to the range sensor 12, and calculating the first range of the target T from the range sensor 12 based on the measured time. Thus, the range sensor 12 may include an emitter and a detector to emit the laser beam and then detect the reflection of the laser beam in a generally conventional manner.

The range sensor 12 is operable to determine a range to a target even when objects, such as trees, people, vehicles, foliage, etc., are positioned between the device and the target. As a result, the range sensor 12 may determine the first range to the target T in a variety of situations, including in outdoor situations where various trees and/or other foliage may obstruct a direct view of the target T.

The range sensor 12 may also include memory and processing capabilities separate from the computing element 16 and memory 18, such that the range sensor is operable to determine the range to the target T without the assistance of additional components. However, the range sensor 12 may rely upon the capabilities provided by the computing element 16 and memory 18 to specifically calculate and determine the first range.

The range sensor 12 may alternatively or additionally include other range sensing components, such as conventional optical, radio, sonar, or visual range sensing devices to determine the first range in a substantially conventional manner.

Figure 6:
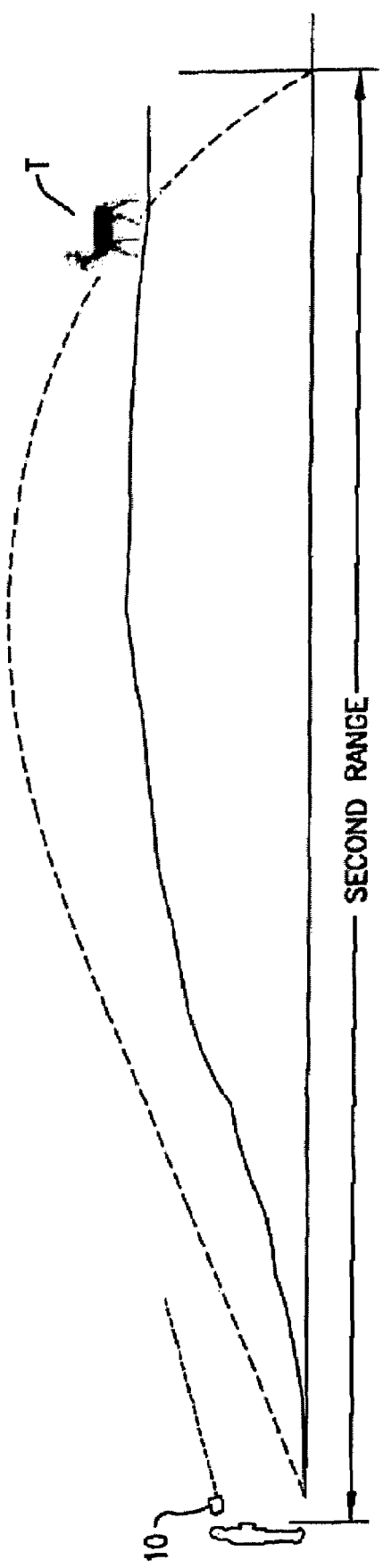
FIG. 6 is a diagram illustrating a second range and an associated projectile trajectory to the target of FIG. 4 when the target is elevated.
Figure 7:
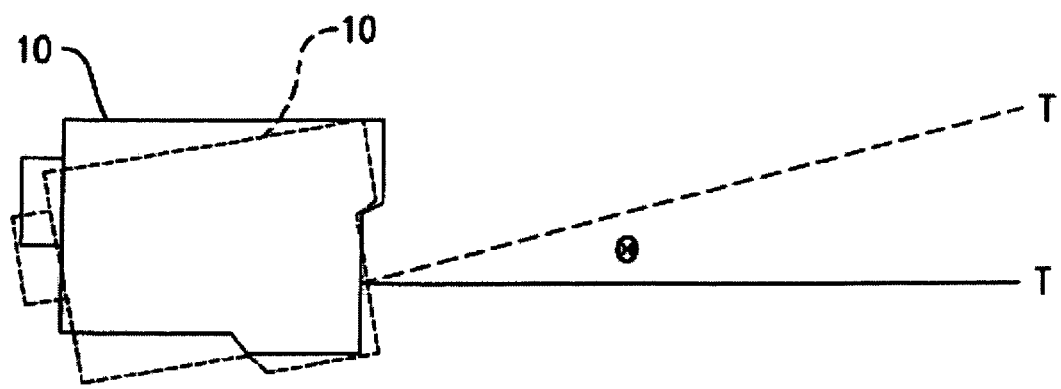
FIG. 7 is a diagram illustrating an angle to an elevated target relative to the device.
Figure 8:
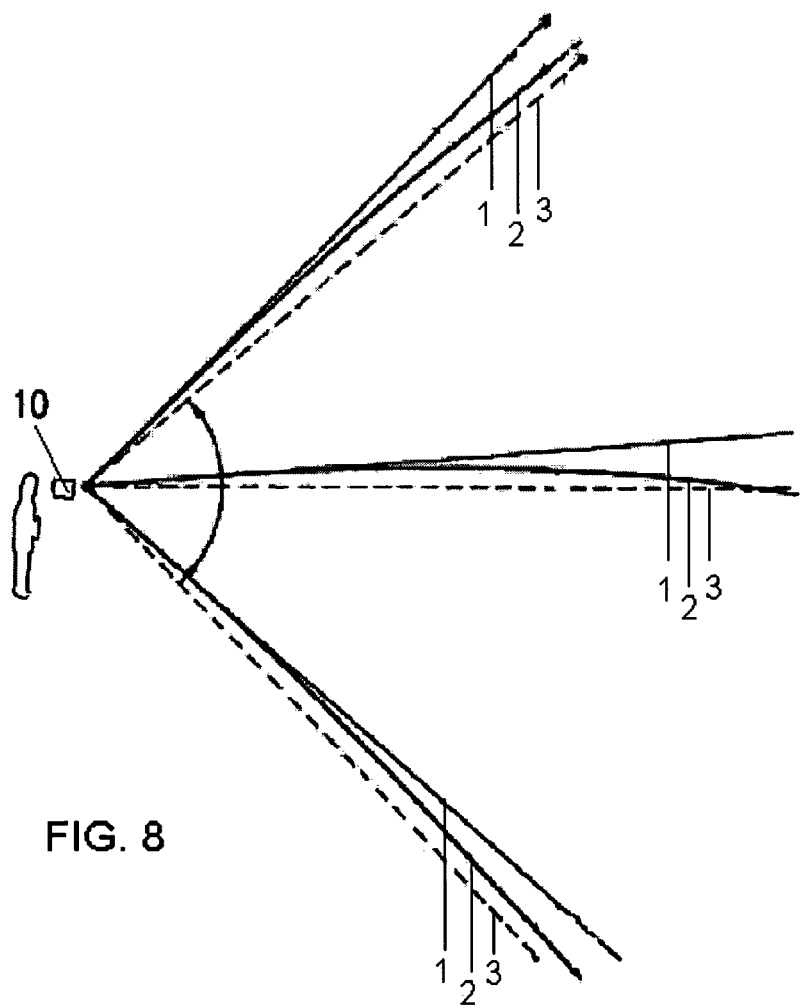
FIG. 8 is a diagram illustrating various angles and projectile trajectories relative to the device.

The tilt sensor 14 is operable to determine the angle to the target T from the device 10 relative to the horizontal. Thus, as shown in FIGS. 5, 7, and 8, if the device 10 and the target T are both positioned on a flat surface having no slope, the angle would be zero. As shown in FIGS. 6 and 8, if the device 10 is positioned below the target T the slope between the device 10 and the target T is positive, the angle would be positive. Conversely, as shown in FIG. 8, if the device 10 is positioned above the target T, such that the slope between the device 10 and the target T is negative, the angle would be negative.

It will be appreciated that the angle is not dependent upon the specific contours of the ground, surface, or surfaces between the device 10 and the target T, but rather the angle is preferably determined based on the orientation of the device 10, as described below.

The tilt sensor 14 preferably determines the angle by sensing the orientation of the device 10 relative to the target T and the horizontal. The orientation of the device 10 changes based on the relative position of the target T to the device 10, as a user of the device 10 aligns the device 10 with the target T and views the target T through an eyepiece 22 and an opposed lens 24, as described in more detail below. Thus, the orientation of the device 10, specifically the tilt of the device 10 along its longitudinal axis relative to the horizontal, indicates if the target T is above or below the device 10.

For example, if the target T is above the device 10, the user of the device 10 would tilt the device 10 such that a distal end 26 of the device 10 would be raised relative to a proximate end 28 of the device 10 and the horizontal. Similarly, if the target T is below the device 10, the user of the device 10 would tilt the device 10 such that the distal end 26 of the device 10 would be lowered relative to the proximate end 28 of the device and the horizontal. T The tilt sensor 14 preferably determines the angle of the target to the device 10 based on the amount of tilt, that is the amount the proximate end 28 is raised or lowered relative to the distal end 26, as described below. The tilt sensor 14 may determine the tilt of the device, and thus the angle, through various orientation determining elements. For instance, the tilt sensor 14 may utilize one or more single-axis or multiple-axis magnetic tilt sensors to detect the strength of a magnetic field around the device 10 or tilt sensor 14 and then determine the tilt of the device 10 and the angle accordingly. The tilt sensor 14 may determine the tilt of the device using other or additional conventional orientation determine elements, including mechanical, chemical, gyroscopic, and/or electronic elements, such as a resistive potentiometer.

Preferably, the tilt sensor 14 is an electronic inclinometer, such as a clinometer, operable to determine both the incline and decline of the device 10 such that the angle may be determined based on the amount of incline or decline. Thus, as the device 10 is aligned with the target T by the user, and the device 10 is tilted such that its proximate end 28 is higher or lower than its distal end 26, the tilt sensor 14 will detect the amount of tilt which is indicative of the angle.

The computing element 16 is coupled with the range sensor 12 and the tilt sensor 14 to determine ballistic information relating to the target T, including hold over ballistic information, as is discussed in more detail below. The computing element 16 may be a microprocessor, microcontroller, or other electrical element or combination of elements, such as a single integrated circuit housed in a single package, multiple integrated circuits housed in single or multiple packages, or any other combination. Similarly, the computing element 16 may be any element which is operable to determine hold over ballistic information from the first range and angle as described below. Thus, the computing element 16 is not limited to conventional microprocessor or microcontroller elements and may include any element which is operable to perform the functions described below.

The memory 18 is coupled with the computing element 16 and is operable to store the computer program and a database including ranges, projectile drop values, and configuration information, as is discussed in detail below. The memory 18 may be, for example, an electronic, magnetic, optical, electromagnetic, infrared, or semi-conductor system, apparatus, device, or propagation medium. More specific, although not inclusive, examples of the memory 18 include the following: volatile and non-volatile memory, an electrical connection having one or more wires, a portable computer diskette, a random access memory (RAM), a read-only memory (ROM), an erasable, programmable, read-only memory (EPROM or Flash memory), an optical fiber, a portable compact disc (CD), or a digital video disc (DVD). However, the memory 18 may be of any form operable to store the necessary computer program and data.

The memory 18 may be integral with the computing element 16, such that the memory 18 and the computing element 16 are stored within or on the same wafer, die, or package, or the memory 18 may be discrete with the computing element 16 such that the memory 18 and the computing element 16 are stored on different wafers, dies, or packages. Additionally, the memory 18 may be coupled with other components, such as the range sensor 12 and tilt sensor 14, to enable the other components to utilize the functionality provided by the memory 18. The memory 18 may also be accessible by other external devices, such as conventional computing devices, to enable data stored within the memory, such as the database or the computer program, to be easily accessed or modified by conventional computing devices.

Figure 10:
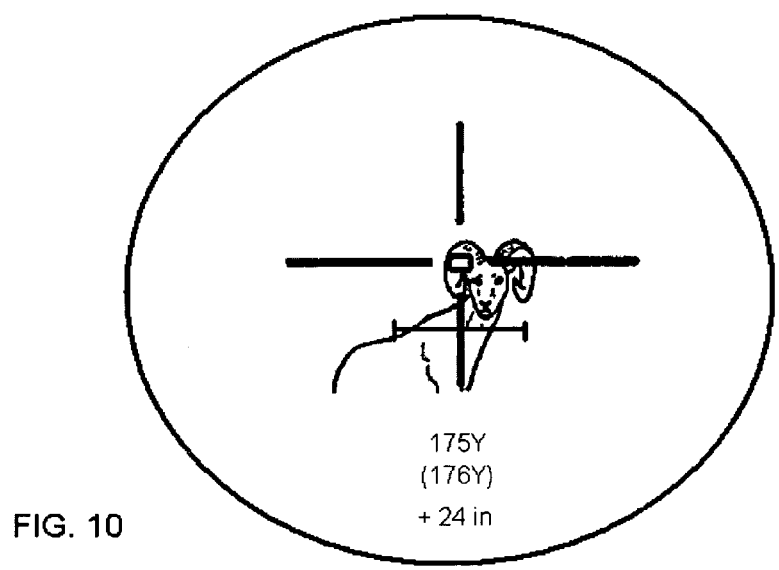
FIG. 10 a schematic view of a target observed while looking through the device, a display indicating the first range, the second range, and a hold over value.

The device 10 also preferably includes a display 30 to indicate relevant information such as the target T, the first range, the angle, and ballistic information such as hold over information, a reticle or other alignment element, etc. The display 30 may be a conventional electronic display, such as a LED, TFT, or LCD display. Preferably, the display 30 is viewed by looking through the eyepiece 22 such that the user may align the target T and simultaneously view relevant information, as shown in FIG. 10.

For instance, the user may look through the eyepiece 22, align the target T, view the target T, and generally simultaneously view the display 30 to determine the first range, the angle θ, hold over value, and/or other relevant information. The generally simultaneous viewing of the target T and the relevant information enables the user to quickly and easily determine ranges and ballistic information corresponding to various targets by moving the device 10 in an appropriate direction and dynamically viewing the change in the relevant information on the display 30.

The portable handheld housing 20 houses the range sensor 12, tilt sensor 14, computing element 16, and/or other desired elements such as the display 30, one or more inputs 32, eyepiece 22, lens 24, laser emitter, laser detector, etc. The handheld housing 20 enables the device 10 be easily and safely transported and maneuvered for convenient use in a variety of locations.

For example, the portable handheld housing 20 may be easily transported in a backpack for use in the field. Additionally, the location of the components on or within the housing 20, such as the position of the eyepiece 22 on the proximate end 28 of the device 10, the position of the lens 24 on the distal end 26 of the device, and the location of the inputs 32, enables the device 10 to be easily and quickly operated by the user with one hand without a great expenditure of time or effort.

The inputs 32 are coupled with the computing element 16 to enable users, third parties, or other devices to share information with the device 10. The inputs 32 is generally associated with the housing 20, such as by physical connection through wires, etc., or wirelessly utilizing conventional wireless protocols. Thus, the inputs 32 need not be physically coupled with the housing 20. However, the inputs 32 are preferably positioned on the housing 20 to enable the user to simultaneously view the display 30 through the eyepiece 22 and function the inputs 32.

The inputs 32 preferably comprise one or more functionable inputs such as buttons, switches, scroll wheels, etc., a touch screen associated with the display 30, voice recognition elements, pointing devices such as mice, touchpads, trackballs, styluses, combinations thereof, etc. Further, the inputs 32 may comprise wired or wireless data transfer elements such as removable memory including the memory 18, network connections, data transceivers, etc., to enable the user and other devices or parties to remotely interface with the device 10.

In operation, the user aligns the device 10 with the target T and views the target T on the display 30. The device 10 may provide generally conventional optical functionality, such as magnification or other optical modification, by utilizing the lens 24 and/or the computing element 16. Preferably, the device 10 provides an increased field of vision as compared to conventional riflescopes to facilitate conventional rangefinding functionality.

Further, the user may function the inputs 32 to control the operation of the device 10. For example, the user may activate the device 10, provide configuration information as discussed below, and/or determine a first range, a second range, angle, and ballistic information by functioning one or more of the inputs 32.

For instance, the user may align the target T by centering the reticle over the target T and functioning at least one of the inputs 32 to cause the range sensor 12 to determine the first range. Alternatively, the range sensor 12 may dynamically determine the first range for all aligned objects such that the user is not required to function the inputs 32 to determine the first range. Similarly, the tilt sensor 14 may dynamically determine the angle for all aligned objects or the tilt sensor may determine the angle when the user functions at least one of the inputs 32. Thus, the ranges, angle, and ballistic information discussed below may be dynamically displayed to the user.

In various embodiments, the device 10 enables the user to provide configuration information to facilitate determination of ballistic information, including hold over information, by the computing element 16. The configuration information includes mode information to enable the user to select between various projectile modes, such as bowhunting and firearm modes discussed below in more detail, to enable the device 10 to provide information corresponding to the selected mode, as is described below. Further, the configuration information may include projectile information, such as a bullet size, caliber, grain, shape, type, etc. and firearm caliber, size, type, sight-in distance, etc.

Figure 9:
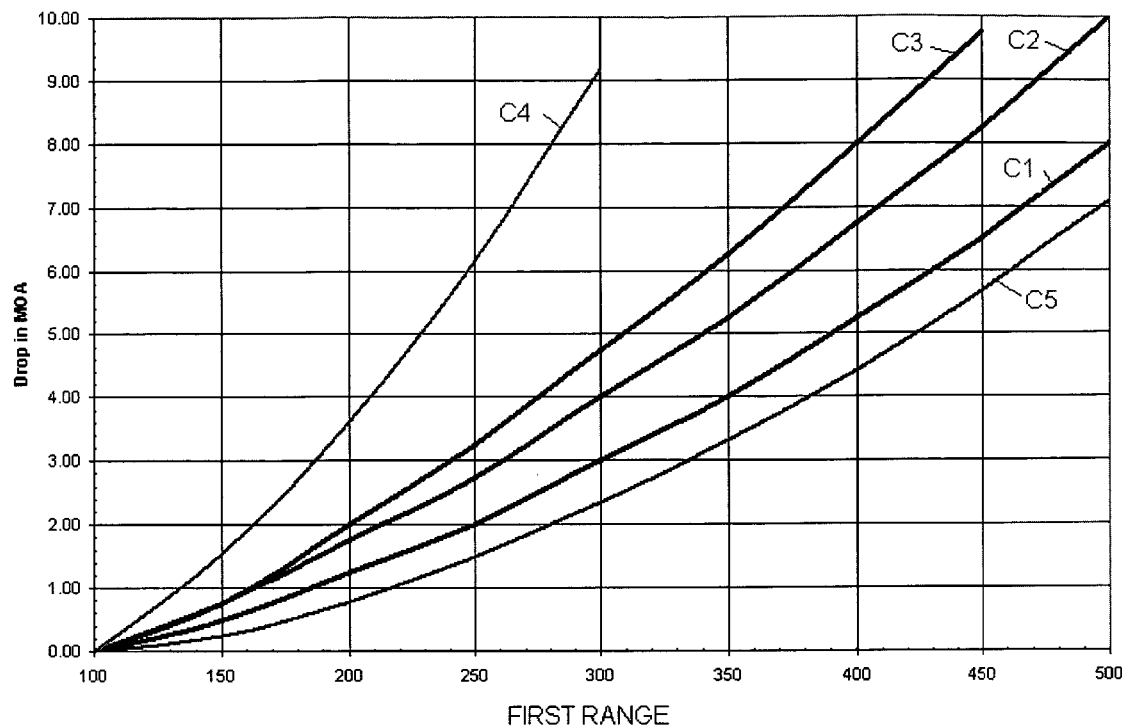
FIG. 9 is a chart illustrating a plurality of ballistic curves.

Preferably, the provided configuration information corresponds to one of a plurality of ballistic curves. For example, the user may select one curve, or provide an indication relating to one curve, instead of entering detailed and complex ballistic information such as bullet shape, grain, caliber, etc. As shown in FIG. 9, five sample curves, C1-C5, are provided each corresponding to a particular ballistic profile. For instance, C4 may correspond to a pistol profile, C3 may correspond to a small-caliber rifle profile, C2 may correspond to a rifle profile, C5 may correspond to a medium-power rifle profile, C1 may correspond to a high-power rifle profile, etc. As should be appreciated, innumerable combinations of ballistic curves may exist each corresponding to any ballistic profile. Various ballistic curves and associated projectile drops are disclosed in U.S. Pat. No. 3,990,155, which is incorporated herein by reference.

The user may provide the configuration information to the device 10 by functioning the inputs 32. For example, the user may depress one or more of the inputs 32 to provide configuration information and/or the user may provide electronic data utilizing the inputs 32 through a data connection, etc. Additionally, the display 30 may present prompts, indication elements, menus, selectable lists, etc., to help the user in providing the configuration information.

Further, the memory 18 may include information corresponding to configuration information to enable the user-provided configuration information to be stored by the memory 18. Also, the memory 18 may include a database of configuration information, such as the plurality of ballistic curves or data corresponding to the ballistic curves, to enable the user to select configuration information from the data stored by the memory 18. For example, the display 30 may provide a listing of stored configuration information for selection by the user.

In embodiments where the memory 18 comprises non-volatile memory, the configuration information may be permanently stored by the user such that the user need not repeatedly provide the information each time the device 10 is used. However, due to the ease in which one of the plurality of ballistic curves may be selected, utilization of non-volatile memory is not necessary in all embodiments.

In various embodiments, the device 10 is operable to determine a second range to the target T and display an indication of the second range to the user. The computing element 16 is coupled with the range sensor 12 and the tilt sensor 14 to determine the second range to the target T based on the first range and the determined angle. The second range may be determined statically such that the second range is determined only at desired intervals or upon input by the user. Conversely, the second range may be dynamically determined such that the second range may be continuously updated as new first ranges or angles or provided. Thus, the second range may be accurately determined for moving targets, such as a hunted animal, as the change in the targets position is accounted for by the dynamic calculations.

The computing element 16 determines the second range to the target T by adjusting the first range based upon the angle. Preferably, the computing element 16 determines the second range by multiplying the first range by the sine or cosine of the angle. For instance, when the hunter is positioned above the target, the first range is multiplied by the sine of the angle to determine the second range. When the hunter is positioned below the target, the first range is multiplied by the cosine of the angle to determine the second range.

Thus, the second range preferably represents a horizontal distance the projectile must travel such that the estimated trajectory of the projectile generally intersects with the target T. In contrast, the first range represents the length of an imaginary line, such as a line of sight, between the device 10 and the target T, which is a substantially straight line, as described above. As is known in the art, projectiles which are not self-propelled, such as bullets, golf balls, footballs, arrows, etc., move through air according to a generally parabolic (ballistic) curve due primarily to the effects of gravity and air drag. In situations where the angle is zero, the parabolic movement of the projectile does not substantially affect the range calculation, such that the first range and the second range may be substantially equal.

As shown in FIG. 6, in situations where the angle is non-zero, such as when the target T is positioned above or below the device 10, the parabolic movement of the projectile affects the range calculation, such that the projectile may have to travel a longer or shorter distance to reach the target T. Thus, the second range provides an accurate representation to the user of the flat-ground distance the projectile must travel to intersect the target T.

For example, referring to FIG. 1, the device 10 would determine the first range to be 9 yards, as the first range generally corresponds to a line of sight between the device 10 and the target T. The device 10 would determine the second range, utilizing the angle acquired by the tilt sensor 14, to be 5 yards, representing the horizontal distance the projectile must travel to strike the target T.

Although the second range may be dynamically presented by the display 30 without requiring user input, the second range is preferably displayed only when the device 10 is in bowhunting mode as indicated by the user-provided information. Such a configuration may be desirable as a true horizontal distance to a target, as indicated by the second range, may be of little use to firearms that have compact ballistic curves due to the high velocity at which fired projectiles travel. In contrast, bow-fired projectiles are fired with controllable force by the user at generally short ranges such that the second range greatly facilitates targeting, as is shown in FIG. 1.

The device 10 is further operable to determine ballistic information including a hold over value corresponding to an amount of hold over. As is known in the art, hold over refers to the amount by which the user must aim high, or above the target, to compensate for the effects of trajectory, projectile drop, and angle. Thus, the hold over value determined by the device 10 provides an indication of how much, or to what degree, the user must aim high in relation to the target to accurately fire a projectile.

FIG. 8 illustrates three exemplary projectile trajectories and corresponding bullet drops. For each angle, positive, zero, and negative, three paths are illustrated: path 1 corresponds to a line of departure, which represents an a projectile trajectory comprising a hypothetical infinite straight line; path 2 corresponds to a parabolic (ballistic) trajectory resulting from the effects of gravity and drag on path 1; and path 3 corresponds to a light of sight to the target. As can be seen, the difference between path 1 and path 2 corresponds to projectile drop, which varies as the range and angle changes.

As is known in the art and as shown in FIG. 8, firing a projectile at uphill or downhill angles affects the trajectory of the projectile by causing the projectile to impact high relative to the projectile path for level fire. The deviations in trajectory grow larger as range and angle increase. Further, projectiles impact slightly higher when fired downhill than uphill at the same angle due to the varying effects of gravity on uphill and downhill trajectories. Thus, to correct for projectile drop, it is generally necessary to aim above a target.

Additionally, as will be appreciated by those skilled in the art, the amount of hold over is dependent on the range at which a firearm is sighted in. For instance, firearms are typically sighted in at 100 yards, to build-in appropriate hold over for projectile drop, such that a user need not hold over when firing at targets at 100 yards, but would need to hold over for targets substantially over 100 yards. The device 10 preferably utilizes a default sight in distance of 100 yards, which may be stored in the memory 18. However, the device 10 may utilize a user-provided sight in distance, as discussed above, to determine the hold over value.

The device 10 may determine the hold over value utilizing various methods. Preferably, the computing element 16 determines the hold over value utilizing the first range and the determined angle by acquiring a projectile drop value corresponding to the first range and modifying the projectile drop value utilizing the determined angle. The projectile drop value corresponds to the amount of vertical projectile drop at a particular range and at zero angle. Similarly, the computing element 16 may acquire a plurality of projectile drop values and modify the plurality of projectile drop values utilizing the acquired angle to determine hold over values accordingly.

The computing element 16 may acquire the projectile drop value from the memory 18. For instance, as described above, the memory 18 may include a database of ballistic information, including a listing, table, chart, etc., of projectile drop values corresponding to various ranges and configuration information. For instance, the database may include data corresponding to the chart of FIG. 9 to enable the retrieval of a projectile drop value, in minutes of angle (MOA), inches, yards, centimeters, reticle positions, etc., based upon the first range.

Preferably, the projectile drop value is retrieved utilizing both the first range and the configuration information. For instance, as is shown in FIG. 9, the projectile drop value may be dependent upon the particular projectile or firearm utilized, such that retrieving a projectile drop value corresponding to a utilized projectile facilitates accurate shooting. Thus, in embodiments where the user selects one of the plurality of ballistic curves, the projectile drop value is preferably retrieved utilizing the selected ballistic curve and the first range.

The computing element 16 may also or additionally acquire the projectile drop value utilizing a look-up table or other database element. For example, the database may include an ordered listing, table, and/or relational listing of ranges, configuration information, and projectile drop values, such that the projectile drop value may be acquired by providing the range and configuration information, such as projectile curve, type, size, etc. Such data corresponding to projectile drop values, ranges, and other ballistic information is commonly available through numerous sources such as bullet manufacturers, firearm manufacturers, internet databases, textbooks, etc., and may be stored within the memory 18 for retrieval by the computing element 16 and/or to help the user in providing configuration information.

Further, as will be appreciated by those skilled in the art, the projectile drop value may be dependent on the range at which the firearm or bow is sighted in. For instance, the chart of FIG. 9 indicates a projectile drop value of zero at 100 yards as a firearm sighted-in at 100 yards and thus on a level surface would experience no additional drop for which compensation is required by the user.

The computing element 16 may utilize a default sight-in range of 100 yards and retrieve projectile drop values accordingly and/or the computing element 16 may utilizing a user-provided sight-in range and retrieve projectile drop values accordingly or modify a retrieved projectile drop value utilizing conventional algorithms to reflect variations in sight-in range.

To compensate for angled projectile trajectories in determining the hold over value, the computing element 16 is operable to utilize the angle determined by the tilt sensor 14 to modify the acquired projectile drop value. As explained above and shown in FIG. 8, the projectile drop value varies according to angle. The amount of variance may be express utilizing a cosine of the acquired angle.

Specifically, the hold over value may be determined by the computing element 16 by multiplying the projectile drop value corresponding to the first range by the cosine of the acquired angle. The hold over value, configuration information, projectile drop values, and other data may be provided and/or displayed utilizing various units. For example, the hold over value and projectile drop values may correspond to minutes of angle, inches, centimeters, reticle positions, combinations thereof, etc. As shown in FIG. 10, the hold over value may be displayed by the display 30 as both a numerical value in inches, 24 inches for example, or as one or more reticles, such as a first reticle and a second reticle.

For instance, the first reticle may be a fixed reticle that corresponds to the sight-in range while the second reticle may be a dynamically-displayed reticle that reflects changes to the first reticle based upon the determined hold over value. The hold over value may also refer to one or more reticles on the user's riflescope, such as the number of dots on the a reticle that the user must aim high.

Further, the information presented on the display 30 may be dependent upon the first range to the target T. Specifically, in situations where the first range is less than 100 yards, the first and second ranges may be displayed, but not the hold over value or angle, as the second range, representing true horizontal distance, is often more important for short-range accuracy than hold over information. For instance, when the device 10 is in bowhunting mode the display 30 presents the first and second ranges but not the hold over value.

In contrast, where the second range is greater than 100 yards, the first range, the hold over value, and/or the angle may be displayed, but not the second range, as the hold over value is often more important for long-range accuracy than true horizontal distance. For instance, when the device 10 is in firearms mode, the first range and the hold over value are preferably shown but not the second range.

Thus, the provided bowhunting mode is preferably limited to ranges less than 100 yards and does not present an indication of the hold over value while the provided firearms mode is not limited to any particular ranges and presents an indication of the first range and the hold over value. As should be appreciated by those skilled in the art, the firearms mode may additionally be operable to calculate a hold under value utilizing the first range and the determined angle.

Although the invention has been described with reference to the preferred embodiments illustrated in the attached drawings, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A rangefinder device for determining hold over ballistic information, the device comprising:
    a range sensor configured for determining a first range to a target;
    a tilt sensor configured for determining an angle to the target relative to the device;
    a display; and
    a computing element coupled with the range sensor and the tilt sensor configured for determining a hold over value based on the first range and the determined angle, and for indicating the first range and the hold over value on the display,
    wherein the computing element is configured for determining the hold over value by ascertaining a vertical distance relative to a projectile trajectory at the first range and modifying the vertical distance utilizing the determined angle.

2. The device as set forth in claim 1, wherein the computing element determines the hold over value by multiplying the ascertained projectile drop value at the first range by the cosine of the determined angle.

3. The device as set forth in claim 1, further including a memory coupled with the computing element, the memory including a database comprising ranges and corresponding vertical distance values relative to a projectile trajectory.

4. The device as set forth in claim 3, further including an input coupled with the computing element to enable a user to provide configuration information such that the computing element is configured to retrieve one of the vertical distance values from the database utilizing the first range and the provided configuration information.

5. The device as set forth in claim 1, wherein the range sensor includes a laser range sensor.

6. The device as set forth in claim 1, wherein the tilt sensor includes an inclinometer.

7. The device as set forth in claim 1, further including a portable handheld housing to house the range sensor, the tilt sensor, and the computing element, wherein the housing is physically independent from any of a weapon, firearm, or rifle.

8. The device as set forth in claim 1, wherein the computing element is further operable to calculate a second range to the target utilizing the first range and the determined angle.

9. A rangefinder device for determining hold over ballistic information, the device comprising:
    a laser range sensor configured for determining a first range to a target;
    a tilt sensor configured for determining an angle to the target relative to the device;
    a memory comprising a database of ranges and corresponding vertical distance values relative to a projectile trajectory;
    a display; and
    a computing element coupled with the range sensor, the tilt sensor, and the memory, configured for determining a hold over value based on the first range and the determined angle by acquiring one of the vertical distance values from the database and modifying the acquired vertical distance value utilizing the determined angle, and for indicating the first range and the hold over value on the display.

10. The device as set forth in claim 9, wherein the computing element determines the hold over value by multiplying the ascertained projectile drop value at the first range by the cosine of the determined angle.

11. The device as set forth in claim 9, further including an input coupled with the computing element to enable a user to provide configuration information such that the computing element is configured to retrieve the vertical distance value from the database utilizing the first range and the provided configuration information.

12. The device as set forth in claim 9, wherein the tilt sensor includes an inclinometer.

13. The device as set forth in claim 9, further including a portable handheld housing to house the range sensor, the tilt sensor, the memory, the computing element, and the display.

14. The device as set forth in claim 9, wherein the computing element is further operable to calculate a second range to the target utilizing the first range and the determined angle.

15. The device as set forth in claim 9, wherein the computing element is operable to provide rifle and bowhunting modes, and the display is operable to indicate the first range and the second range when the computing element is in the bowhunting mode.

16. A rangefinder device for determining hold over ballistic in formation, the device comprising:
    a laser range sensor configured for determining a first range to a target;
    a tilt sensor configured for determining an angle to the target relative to the device, the tilt sensor including an inclinometer;
    an input configured for receiving configuration information from a user;
    a memory comprising a database of ranges and corresponding vertical distance values relative to a ballistic trajectory;
    a display;
    a computing element coupled with the range sensor, the tilt sensor, the input, and the memory, configured for determining a hold over value based on the first range, the configuration information, and the determined angle by acquiring one of the vertical distance values from the database and modifying the acquired vertical distance value utilizing the determined angle, and for indicating the first range and the hold over value on the display; and a portable handheld housing to house the range sensor, the tilt sensor, the input, the memory, the computing element, and the display.

17. The device as set forth in claim 16, wherein the computing element is further operable to calculate a second range to the target utilizing the first range and the determined angle.

18. The device as set forth in claim 17, wherein the computing element is operable to provide rifle and bowhunting modes, and the display is operable to indicate the first range and the second range when the computing element is in the bowhunting mode.

19. The device as set forth in claim 16, wherein the computing element determines the hold over value by multiplying the ascertained projectile drop value at the first range by the cosine of the determined angle.

20. The device as set forth in claim 16, wherein the configuration information corresponds to one of a plurality of ballistic curves.

21. The device as set forth in claim 16, wherein the configuration information corresponds to a firearm projectile and the configuration information includes a bullet size and a bullet grain.

22. The device as set forth in claim 16, wherein the configuration information corresponds to a projectile fired from a bow.

* * * * *